US011225571B2

(12) United States Patent
Schulz et al.

(10) Patent No.: US 11,225,571 B2
(45) Date of Patent: Jan. 18, 2022

(54) STYRENE COPOLYMER COMPOSITION WITH IMPROVED RESIDUAL GLOSS

(71) Applicant: INEOS STYROLUTION GROUP GMBH, Frankfurt am Main (DE)

(72) Inventors: Tobias Schulz, Cologne (DE); Norbert Niessner, Friedelsheim (DE); Eike Jahnke, Aubonne (CH); Hans-Werner Schmidt, Bayreuth (DE); Tristan Kolb, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 20 days.

(21) Appl. No.: 16/633,362

(22) PCT Filed: Jul. 25, 2018

(86) PCT No.: PCT/EP2018/070158
§ 371 (c)(1),
(2) Date: Jan. 23, 2020

(87) PCT Pub. No.: WO2019/020688
PCT Pub. Date: Jan. 31, 2019

(65) Prior Publication Data
US 2021/0155787 A1   May 27, 2021

(51) Int. Cl.
*C08L 25/14* (2006.01)
*C08L 23/08* (2006.01)
*C08L 25/12* (2006.01)
*C08L 91/06* (2006.01)
*C08L 25/16* (2006.01)
*C08K 3/32* (2006.01)
*C08K 3/013* (2018.01)

(52) U.S. Cl.
CPC ............ *C08L 25/14* (2013.01); *C08K 3/32* (2013.01); *C08L 23/0838* (2013.01); *C08L 25/12* (2013.01); *C08L 25/16* (2013.01); *C08L 91/06* (2013.01); *C08K 3/013* (2018.01); *C08K 2003/324* (2013.01); *C08K 2003/325* (2013.01); *C08L 2203/20* (2013.01); *C08L 2205/03* (2013.01)

(58) Field of Classification Search
CPC .... C08K 3/32; C08K 3/013; C08K 2003/325; C08L 25/14; C08L 23/0838; C08L 25/12; C08L 91/06; C08L 25/16; C08L 2203/20; C08L 2205/03
See application file for complete search history.

(56) References Cited

U.S. PATENT DOCUMENTS

| 8,974,898 | B2 | 3/2015 | Lin |
| 2010/0168284 | A1 | 7/2010 | Gaggar et al. |
| 2012/0076071 | A1 | 3/2012 | Kim et al. |
| 2012/0095135 | A1 | 4/2012 | Mori et al. |

FOREIGN PATENT DOCUMENTS

| CN | 101838435 B | 12/2011 |
| CN | 102660084 A | 9/2012 |
| EP | 2660268 A1 | 11/2013 |
| JP | S57187346 A | 11/1982 |
| JP | S61118433 A | 6/1986 |
| JP | S6239610 A | 2/1987 |
| JP | H0625507 A | 2/1994 |
| JP | 2017110180 A | 6/2017 |
| KR | 100779519 B1 | 11/2007 |
| KR | 20100053905 A | 5/2010 |

OTHER PUBLICATIONS

Ehlert et al., "A General Route to Optically Transparent Highly Filled Polymer Nanocomposites", Macromolecules, 2015, 48, (15), pp. 5323-5327.
Ehlert et al., "Polymer Ligand Exchange to Control Stabilization and Compatibilization of Nanocrystals", ACS Nano, 2014, vol. 8, No. 6, pp. 6114-6122.
Sascha Philipp Ehlert "Preparation of Fully Miscible Nanocomposites", Dissertation, University of Bayreuth, Hamburg, Bayreuth, 2014.
Daniela Pirner "Controlled Preparation of Nanoparticles and Polymer Core-Shell Structures for Use in Organogels and Nanocomposites", Dissertation, University of Bayreuth, Hamburg, Bayreuth, 2016.

*Primary Examiner* — Patrick D Niland
(74) *Attorney, Agent, or Firm* — J.A. Lindeman & Co. PLLC; Aaron Raphael

(57) ABSTRACT

Thermoplastic polymer compositions (P) comprising 90 to 99.9 wt.-% of at least one styrene-based copolymer, 0.1 to 10 wt.-% of at least one copolymer at least comprising repeating units derived from at least one α-olefin monomer and at least one vinyl-aromatic monomer, at least one inorganic phosphate compound, at least one polyolefin wax and optionally at least one colorant, dye or pigment, and/or at least one further additive show improved properties with respect to residual gloss after abrasion combined with improved melt flow characteristics while heat resistance is not affected.

20 Claims, No Drawings

STYRENE COPOLYMER COMPOSITION WITH IMPROVED RESIDUAL GLOSS

The present invention relates to thermoplastic polymer compositions (P) comprising at least one styrene-based polymer (A) and at least one copolymer composition (B) comprising at least one copolymer of at least one α-olefin monomer and at least one vinyl-aromatic monomer, and at least one inorganic phosphate compound. The thermoplastic polymer composition (P) is characterized by having improved residual gloss after abrasion combined with improved melt flow characteristics while heat resistance is substantially not affected.

Styrene copolymers are widely used in many applications, e.g. in automotive industry or for household goods. The popularity of these thermoplastic polymer compositions may be attributed to their balanced properties of good melt flow characteristics which is an important feature for injection molding processes, combined with a competitive price and good UV resistance.

As with many polymers, the resistance of conventional styrene copolymers against scratch and abrasion is very low. In view of this, alternative solutions have been established in the art for the provision of scratch-resistant surfaces of polymer articles. One solution was found in the application of poly(methyl methacrylate) (PMMA) as base polymer of the respective articles. PMMA is characterized by having good scratch resisting properties. However, compared to polystyrene and styrene copolymers, PMMA is a rather expensive material. A further solution to the above-mentioned problem is to apply a scratch-resistant curable coating (e.g. a UV-curable coating) on the surface of the polymer article. This approach, however, is typically also expensive and requires an additional processing step resulting in higher cycle time.

Different approaches to improve the properties of thermoplastic polymer compositions are known in the art.

Styrene-based resin compositions with improved scratch resistance are reported for example in applications JP H0625507A, JP 0000S6239610A, JP 000S57187346A and JP 000S61118433A. Scratch resistance improvements are achieved by the addition of organopolysiloxane compounds.

Other publications report on scratch resistance improvements of polymers achieved by the addition of nanoparticles. In this respect, the use of alumina (CN 101838435 B) and silica nanoparticles (U.S. Pat. No. 8,974,898, KR102010053905A) is mentioned. EP-A 2 660 268 reports the effect of inorganic nanoparticles, selected from hydroxides, oxides, sulfides, metals or inorganic salts. Also, S. Ehlert et al. report on properties of polymer compositions comprising nanoparticles of metals, metal oxides and metal sulfides. Reference is made to Macromolecules, 2015, 48 (15), pp 5323-5327; ACS NANO, Vol. 8, No. 6, 6114-6122, 2014; and S. Ehlert's Dissertation (University of Bayreuth, Germany, 2014).

In view of this, it was an object of the present invention to improve the characteristics of styrene-based thermoplastic polymer compositions with respect to residual gloss after abrasion. Furthermore, the improvements should be achievable with little financial and technical effort.

DISCLOSURE OF THE INVENTION

The present invention relates to a thermoplastic polymer composition (P) comprising (or consisting of):

(A) 90 to 99.9 wt.-%, based on the total weight of the thermoplastic polymer composition (P), of at least one styrene-based copolymer;

(B) 0.1 to 10 wt.-%, based on the total weight of the thermoplastic polymer composition (P), of at least one copolymer composition comprising:
  (B-1) 75 to 98 wt.-%, preferably 75 to 96 wt.-%, based on the total weight of the copolymer composition (B), of at least one copolymer at least comprising repeating units derived from at least one α-olefin monomer and at least one vinyl-aromatic monomer;
  (B-2) 1 to 25 wt.-%, preferably 3 to 10 wt.-%, based on the total weight of the copolymer composition (B), of at least one inorganic phosphate compound; and
  (B-3) 1 to 22 wt.-%, based on the total weight of the copolymer composition (B), of at least one polyolefin wax;

(C) 0 to 9.9 wt.-%, based on the total weight of the thermoplastic polymer composition (P), of at least one colorant, dye or pigment; and (D) 0 to 3 wt.-%, based on the total weight of the thermoplastic polymer composition (P), of at least one further additive.

It was surprisingly found that the properties of styrene-based copolymers can be significantly improved with respect to their residual gloss after abrasion by the addition of 0.1 to 10 wt.-% of at least one copolymer composition (B) comprising 75 to 98 wt.-% of at least one copolymer (B-1) at least comprising repeating units derived from at least one α-olefin monomer and at least one vinyl-aromatic monomer, and 3 to 10 wt.-% of at least one inorganic phosphate compound (B-2). The at least one copolymer composition (B) further comprises 1 to 22 wt.-%, preferably 5 to 20 wt.-%, and in particular 10 to 15 wt.-%, of at least one polyolefin wax.

In a preferred embodiment of the invention, the thermoplastic polymer composition (P) comprises (or consists of):

(A) 95 to 99.5 wt.-%, based on the total weight of the thermoplastic polymer composition (P), of at least one styrene-based copolymer;

(B) 0.5 to 5 wt.-%, based on the total weight of the thermoplastic polymer composition (P), of at least one copolymer composition comprising:
  (B-1) 75 to 96 wt.-%, based on the total weight of the copolymer composition (B), of at least one copolymer at least comprising repeating units derived from at least one α-olefin monomer and at least one vinyl-aromatic monomer;
  (B-2) 3 to 10 wt.-%, based on the total weight of the copolymer composition (B), of at least one inorganic phosphate compound; and
  (B-3) 1 to 22 wt.-%, based on the total weight of the copolymer composition (B), of at least one polyolefin wax;

(C) 0 to 4.5 wt.-%, based on the total weight of the thermoplastic polymer composition (P), of at least one colorant, dye or pigment; and (D) 0 to 3 wt.-%, based on the total weight of the thermoplastic polymer composition (P), of at least one further additive.

Moreover it was found that the properties of the thermoplastic polymer composition (P) may further be improved if the at least one polymer composition (B) comprises 5 to 20 wt.-%, preferably 8 to 18 wt.-%, in particular 10 to 15 wt.-%, based on the total weight of the copolymer composition (B), of the at least one polyolefin wax (B-3).

Thus, in a further embodiment of the invention, the thermoplastic polymer composition (P) comprises (or consists of):
(A) 95 to 99.5 wt.-%, based on the total weight of the thermoplastic polymer composition (P), of at least one styrene-based copolymer;
(B) 0.5 to 5 wt.-%, based on the total weight of the thermoplastic polymer composition (P), of at least one copolymer composition comprising:
  (B-1) 77 to 91 wt.-%, preferably 77. to 87 wt.-%, in particular 79 to 84.5 wt.-%, based on the total weight of the copolymer composition (B), of at least one copolymer at least comprising repeating units derived from at least one α-olefin monomer and at least one vinyl-aromatic monomer; and
  (B-2) 4 to 8 wt.-%, preferably 5 to 7 wt.-%, in particular 5.5 to 6 wt.-%, based on the total weight of the copolymer composition (B), of at least one inorganic phosphate compound;
  (B-3) 5 to 20 wt.-%, preferably 8 to 18 wt.-%, in particular 10 to 15 wt.-%, based on the total weight of the copolymer composition (B), of at least one polyolefin wax.
(C) 0 to 4.5 wt.-%, based on the total weight of the thermoplastic polymer composition (P), of at least one colorant, dye or pigment; and
(D) 0 to 3 wt.-%, based on the total weight of the thermoplastic polymer composition (P), of at least one further additive.

In a further alternative preferred embodiment of the invention, the thermoplastic polymer composition (P) comprises (or consists of):
(A) 95 to 99.4 wt.-%, based on the total weight of the thermoplastic polymer composition (P), of at least one styrene-based copolymer;
(B) 0.5 to 5 wt.-%, preferably 0.5 to 4.9 wt.-%, based on the total weight of the thermoplastic polymer composition (P), of the at least one copolymer composition;
(C) 0.1 to 4.5 wt.-%, based on the total weight of the thermoplastic polymer composition (P), of at least one colorant, dye or pigment; and
(D) 0 to 3 wt.-%, based on the total weight of the thermoplastic polymer composition (P), of at least one further additive.

In a further alternative preferred embodiment of the invention, the thermoplastic polymer composition (P) comprises (or consists of):
(A) 95 to 99.4 wt.-%, based on the total weight of the thermoplastic polymer composition (P), of at least one styrene-based copolymer;
(B) 0.5 to 5 wt.-%, preferably 0.5 to 4.9 wt.-%, based on the total weight of the thermoplastic polymer composition (P), of the at least one copolymer composition;
(C) 0 to 4.5 wt.-%, based on the total weight of the thermoplastic polymer composition (P), of at least one colorant, dye or pigment; and
(D) 0.1 to 3 wt.-%, based on the total weight of the thermoplastic polymer composition (P), of at least one further additive.

In a further alternative preferred embodiment of the invention, the thermoplastic polymer composition (P) comprises (or consists of):
(A) 95 to 99.3 wt.-%, based on the total weight of the thermoplastic polymer composition (P), of at least one styrene-based copolymer;
(B) 0.5 to 5 wt.-%, preferably 0.5 to 4.8 wt.-%, based on the total weight of the thermoplastic polymer composition (P), of the at least one copolymer composition;
(C) 0.1 to 4.5 wt.-%, based on the total weight of the thermoplastic polymer composition (P), of at least one colorant, dye or pigment; and
(D) 0.1 to 3 wt.-%, based on the total weight of the thermoplastic polymer composition (P), of at least one further additive.

In the following, the components/constituents (A) to (D) are described in further detail.

Styrene-Based Copolymer (Constituent A)

The thermoplastic copolymer composition (P) comprises 90 to 99.9 wt.-%, based on the total weight of the thermoplastic copolymer composition (P), of at least one styrene-based copolymer (A). Preferably, the at least one styrene-based copolymer (A) is comprised in the thermoplastic copolymer composition in amounts of 95 to 99.5 wt.-% and in particular 96 to 99.5 wt.-%, based on the total weight of the thermoplastic copolymer composition (P).

Styrene-based copolymers (A) are well known in the art and typically represent copolymers of styrene and/or α-methyl styrene with suitable co-monomers. In a preferred embodiment, comonomers having polar functional groups are preferred, e.g. as acrylonitrile, meth acrylonitrile, methyl methacrylate, maleic acid anhydride and N-phenylmaleimide.

Particular preferred co-monomers are acrylonitrile, meth acrylonitrile, and methyl methacrylate. Most preferred co-monomers are acrylonitrile and methyl methacrylate. Particular suitable styrene-based copolymers (A) within the meaning of this invention are thus copolymers from styrene and/or α-methyl styrene and acrylonitrile and/or methyl methacrylate as comonomer.

In a preferred embodiment, the styrene-based copolymer comprises no impact-modified styrene-based copolymer or rubber-modified styrene-based copolymer.

In a further preferred embodiment of the invention, the thermoplastic polymer composition (P) comprises at least one styrene-based copolymer (A) selected from poly(styrene-co-acrylonitrile) (SAN), poly(α-methyl styrene-co-acrylonitrile) (AMSAN), poly(styrene-co-methyl methacrylate) (SMMA) and mixtures thereof. Particular preferred are styrene-based copolymers (A) selected from poly(α-methyl styrene-co-acrylonitrile) (AMSAN), poly(styrene-co-methyl methacrylate) (SMMA) and mixtures thereof.

Poly(styrene-acrylonitrile) (SAN) and/or poly(α-methyl styrene/acrylonitrile) (AMSAN) are copolymers known in the art. In general, any SAN and/or AMSAN copolymer known in in the art may be used within the subject-matter of the present invention.

In a preferred embodiment, the SAN and AMSAN copolymers of the present invention contain:
  from 50 to 99 wt.-%, based on the total weight of the SAN and/or AMSAN copolymer, of at least one member selected from the group consisting of styrene and α-methyl styrene, and
  from 1 to 50 wt.-%, based on the total weight of the SAN and/or AMSAN copolymer, of acrylonitrile.

The weight average molecular weight (as determined by gel permeation chromatography relative to polystyrene as standard and THF as solvent) of the SAN or AMSAN copolymer is often in the range of 15,000 to 200,000 g/mol, preferably in the range of 30,000 to 150.000 g/mol.

Particularly preferred ratios by weight of the components making up the SAN or AMSAN copolymer are 60 to 95 wt.-%, based on the total weight of the SAN and/or AMSAN copolymer, of styrene and/or α-methyl styrene and 40 to 5 wt.-%, based on the total weight of the SAN and/or AMSAN copolymer, of acrylonitrile.

Particularly preferred are SAN or AMSAN containing proportions of incorporated acrylonitrile monomer units of <36 wt.-%, based on the total weight of the SAN and/or AMSAN copolymer.

Preferred are copolymers as component made from, based on from 65 to 81 wt.-%, based on the total weight of the SAN and/or AMSAN copolymer, of at least one member selected from the group consisting of styrene and α-methyl styrene, and from 19 to 35 wt.-%, based on the total weight of the SAN and/or AMSAN copolymer, of acrylonitrile.

Among the afore-mentioned, most preferred SAN or AMSAN copolymers, those having a viscosity number VN (determined according to DIN 53726 at 25° C., 0.5% by weight in dimethylformamide) of from 50 to 120 ml/g are in particular preferred.

The copolymers of SAN or AMSAN component are known and the methods for their preparation, for instance, by radical polymerization, more particularly by emulsion, suspension, solution and bulk polymerization are also well documented in the literature.

Details concerning the production of these resins are described for example in U.S. Pat. Nos. 4,009,226 and 4,181,788. Vinyl resins produced by bulk polymerization or solution polymerization have proved to be particularly suitable. The copolymers may be added alone or as an arbitrary mixture.

Said AMSAN copolymers are known products which are commercially available e.g. from INEOS Styrolution GmbH (Frankfurt, Germany) as Luran® HH-120.

Poly(styrene-co-methyl methacrylate) (SMMA) within the meaning of the present invention is any copolymer of methyl methacrylate and styrene. Typical SMMA copolymers are known in the art. In general, any SMMA copolymer known in the art may be used within the subject-matter of the present invention.

In a preferred embodiment, the SMMA copolymer comprises at least one copolymer obtained by the polymerization of 70 to 90 wt.-%, based on the total weight of the monomer composition, of styrene and 10 to 30 wt.-%, based on the total weight of the monomer composition, of methyl methacrylate.

In a further preferred embodiment, the amount of styrene is from 70 to 85 wt.-% and the amount of methyl methacrylate is from 15 to 30 wt.-%. In particular preferred SMMA copolymers the amount of styrene is from 70 to 80 wt.-% and the amount of methyl methacrylate is from 20 to 30 wt.-%. Most preferred are SMMA copolymers wherein the amount present of styrene is from 74 to 80 wt.-% and the amount present of methyl methacrylate is from 20 to 26 wt.-%.

Said SMMA copolymers are known products which are commercially available from INEOS Styrolution GmbH (Frankfurt, Germany) as NAS® 21, NAS®30, and NAS® 90.

Copolymer Composition (B) (Constituent B)

The thermoplastic polymer composition (P) comprises 0.1 to 10 wt.-%, preferably 0.5 to 5 wt.-%, and in particular 1 to 4 wt.-%, based on the entire weight of the thermoplastic polymer composition (P), of at least one copolymer composition (B), wherein the copolymer composition (B) comprises at least the following constituents (B-1) and (B-2):

(B-1) at least one copolymer at least comprising repeating units derived from at least one α-olefin monomer and at least one vinyl-aromatic monomer; and (B-2) at least one inorganic phosphate compound.

Constituent (B-1) is preferably present in an amount of 75 to 96 wt.-%, more preferably 77 to 92 wt.-%, further more preferably 77 to 87 wt.-% and in particular 79 to 84.5 wt. %, based on the total weight of the copolymer composition (B).

Constituent (B-2) is preferably present in an amount of 3 to 10 wt.-%, more preferably 4 to 8 wt.-%, further more preferably 5 to 7 wt.-% and in particular 5.5 to 6 wt.-% based on the total weight of the copolymer composition (B).

In a preferred embodiment, the copolymer (B-1) at least comprising repeating units derived from at least one α-olefin monomer and at least one vinyl-aromatic monomer is a copolymer comprising repeating units derived from ethylene and styrene. In an alternative embodiment, the copolymer (B-1) further comprises repeating units derived from monomers other than ethylene and styrene, preferably derived from silicon-containing monomers, such as dialkylsilyl moieties, e.g. dimethylsilyl moieties.

The copolymer (B-1) is preferably a block-copolymer, in particular a graft copolymer at least comprising repeating units derived from at least one α-olefin monomer and at least one vinyl-aromatic monomer. Particular preferred is a graft copolymer wherein the graft base is substantially composed of repeating units derived from ethylene. In particular, the graft base is composed of repeating units derived from ethylene in an amount of more than 90 wt.-%, preferably more than 95 wt.-% and in particular more than 97 wt.-% based on the total weight of the graft base. Polystyrene blocks are grafted on or onto the polyethylene graft base. The polystyrene blocks are composed of repeating units derived from styrene in an amount of more than 90 wt.-%, preferably more than 95 wt.-% and in particular more than 97 wt.-%, based on the total weight of the grafted block.

The at least one copolymer (B-1) has a weight average molecular weight Mw of 20,000 g/mol to 800,000 g/mol, often 100,000 g/mol to 700,000 g/mol, preferably 500,000 g/mol to 700,000 g/mol, as determined by gel permeation chromatography and THF as solvent.

The at least one copolymer composition (B) comprises at least one inorganic phosphate compound (B-2). The inorganic phosphate compound (B-2) may be selected from phosphate salts of main group metals and transition group metals, preferably main group metals and in particular alkaline metals and earth alkaline metals.

In a preferred embodiment of the invention, the at least one inorganic phosphate compound (B-2) comprises at least one inorganic phosphate compound, preferably an alkaline phosphate compound, an earth alkaline phosphate compound or mixtures thereof. Preferred embodiments comprise, but are not limited to, $Na_3PO_4$, $K_3PO_4$, $Li_3PO_4$, $Rb_3PO_4$, $Mg_3(PO_4)_2$, $Ca_3(PO_4)_2$, $Sr_3(PO_4)_2$, $Ba_3(PO_4)_2$, and mixtures thereof. In a particular preferred embodiment, the at least one inorganic phosphate compound (B-2) comprises at least one earth alkaline phosphate, preferably selected from $Mg_3(PO_4)_2$, $Ca_3(PO_4)_2$ and mixtures thereof. Particular preferred is an embodiment, wherein the at least one inorganic phosphate compound (B-2) is composed of $Ca_3(PO_4)_2$ in an amount of at least 80 wt.-%, preferably at least 90 wt.-% of the total weight of the at least one inorganic phosphate compound (B-2), and preferably consists of $Ca_3(PO_4)_2$.

The at least one copolymer composition (B) comprises a further constituent (B-3) comprising at least one polyolefin wax. It was found that the addition of the at least polyolefin wax in amounts of 1 to 22 wt.-%, preferably 5 to 20 wt.-%, more preferred 8 to 18 wt.-%, and in particular 10 to 15 wt.-%, based on the total weight of the copolymer composition (B), has beneficial effects on the properties of the thermoplastic polymer composition. The at least one polyolefin wax preferably has a weight average molecular weight Mw determined by gel permeation chromatography of less than 10,000 g/mol.

In a particular preferred embodiment, the at least one polyolefin wax (B-3) comprises a mixture of at least two different polyolefin waxes, in particular a mixture of at least two polyethylene waxes having different weight average molecular weights Mw. Preferably, the at least one polyolefin wax (B-3) comprises a mixture of at least two polyethylene waxes, wherein the first polyethylene wax has a weight average molecular weight Mw as determined by gel permeation chromatography of ≥1,000 to ≤10,000 g/mol and the second polyethylene wax has a weight average molecular weight Mw as determined by gel permeation chromatography of ≥100 to <1,000 g/mol.

In a further embodiment, the copolymer composition (B) preferably has a has a melting temperature in the range of 60 to 100° C., in particular in the range of 70° C. to 90° C.

The constituents (B-1), (B-2) and (B-3) are known in the art and may be prepared by any known method. The copolymer composition (B) may be prepared by mixing the constituents (B-1), (B-2) and (B-3) in an appropriate mixing apparatus, including discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders. Alternatively, the constituents (B-1), (B-2) and (B-3) may be directly admixed with the constituents (A), (C) and (D) as described below. The preparation of a homogeneous mixture of constituents (B-1), (B-2) and (B-3) in order to compose constituent (B) is not necessary.

Dyes, Pigments, Colorants (Constituent C)

The thermoplastic polymer composition (P) may further comprise 0 to 9.9 wt.-%, preferably 0.1 to 7 wt.-% and in particular 0.5 to 5 wt.-% of dyes, pigments, or colorants (C) which may be added in form of master batches comprising the dyes, pigments, or colorants (C) in a polymer matrix. In a preferred embodiment, the dyes, pigments, or colorants (C) are added in form of a master batch comprising 20 to 70 wt.-%, preferably 40 to 60 wt.-%, based on the total amount of the master batch, of dyes, pigments, colorants (C) or mixtures thereof and 30 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Additives (Constituent D)

Various additives (D) may be added to the molding compounds in amounts of from 0 to 3 wt.-% as assistants and processing additives. Suitable additives (D) include all substances customarily employed for processing or finishing the polymers.

Additives (D) may be added in form of master batches comprising additives (D) in a polymer matrix. In a preferred embodiment, the additives (D) are added in form of a master batch comprising 20 to 70 wt.-%, preferably 40 to 60 wt.-%, based on the total amount of the master batch, of additives (D) or mixtures thereof and 20 to 80 wt.-%, preferably 40 to 60 wt.-%, based on the total amount of the master batch, a copolymer of an vinylaromatic olefin and acrylonitrile as matrix polymer. Preferably, the matrix polymer is selected from poly(styrene-acrylonitrile) (SAN), poly(α-methyl styrene/acrylonitrile) (AMSAN), and/or poly(styrene-methyl methacrylate) (SMMA).

Examples include antistatic agents, antioxidants, flame retardants, stabilizers for improving thermal stability, stabilizers for increasing photostability, stabilizers for enhancing hydrolysis resistance and chemical resistance, anti-thermal decomposition agents and in particular lubricants that are useful for production of molded bodies/articles. These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Hans Zweifel, Hanser Publishers, 6. Edition, 2009.

Examples of suitable antistatic agents include amine derivatives such as N,N-bis(hydroxyalkyl)alkylamines or N,N-bis(hydroxyalkyl)alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range.

In addition to the phenolic antioxidants cited above by way of example, it is also possible to use so-called co-stabilizers, in particular phosphorus- or sulfur-containing co-stabilizers. These phosphorus- or sulfur-containing co-stabilizers are known to those skilled in the art.

Examples of suitable flame retardants that may be used include:

halogen-containing or phosphorus-containing compounds, magnesium hydroxide, and also other commonly used compounds, or mixtures thereof. In a preferred embodiment, the thermoplastic polymer composition may comprise an organic phosphate compound selected from an organic phosphate of the general formula O=P(OR)$_3$, wherein each R independently represents an linear, branched or cyclic, saturated or unsaturated alkyl group having 1 to 12 carbon atoms, or an aryl group having 5 to 12 carbon atoms.

Examples of suitable light stabilizers include various substituted resorcinols, salicylates, benzotriazoles and benzophenones.

Suitable matting agents include not only inorganic substances such as talc, glass beads or metal carbonates (for example $MgCO_3$, $CaCO_3$) but also polymer particles, in particular spherical particles having diameters $D_{50}$ greater than 1 µm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (weight-average molecular weight Mw above 2,000,000 g/mol).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components. The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable stabilizers include hindered phenols but also vitamin E and compounds having analogous structures and also butylated condensation products of p-cresol and dicyclopentadiene. HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$ alkyl esters of thiopropionic acid, in particular the stearyl esters and lauryl esters. It is also possible to use the dilauryl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol).

Suitable lubricants and demolding agents include stearic acids, stearyl alcohol, stearic esters, amide waxes (e.g bis(stearylamide)), and/or generally higher fatty acids, derivatives thereof and corresponding fatty acid mixtures comprising 12 to 30 carbon atoms. Also particularly suitable is ethylene-bis(stearamide).

Preparation of the Thermoplastic Polymer Composition (P)

The invention also relates to a process for preparing a thermoplastic polymer composition (P) disclosed above, wherein the process comprises at least the following steps:

a) Providing the components (A) and (B), and—where present—(C) and/or (D), in the predetermined amounts to an optionally heatable mixing device; and
b) Blending the components (A) and (B), and—where present—(C) and/or (D), in the optionally heatable mixing device at temperatures above the glass transition temperature of the components (A) and (B), and—where present—(C) and/or (D), to obtain the thermoplastic polymer composition (P).

As previously described, the invention also relates to a process for preparing a thermoplastic polymer composition (P) disclosed above, wherein the process comprises at least the following steps:

a) Providing the components (A), (B-1) and (B-2), and—where present—(B-3), (C) and/or (D), in the predetermined amounts to an optionally heatable mixing device; and
b) Blending the components (A), (B-1) and (B-2), and—where present—(B-3), (C) and/or (D), in the optionally heatable mixing device at temperatures above the glass transition temperature of the components A), (B-1) and (B-2), and—where present—(B-3), (C) and/or (D), to obtain the thermoplastic polymer composition (P).

Optionally, a step in which a homogenous particulate material mixture is prepared from the components (A) and (B) (or (B-1) and (B-2)), and—where present—(B-3), (C) and/or (D), may be carried out prior to step b). However, also when provided to the optionally heatable mixing device without previous mixing, a homogenous mixing is typically achieved in the optionally heatable mixing device.

Components (A) and (B) (or (B-1) and (B-2)), and—where present—(B-3), (C) and/or (D) are typically provided in form of particulate materials having different particle sizes and particle size distributions. Typically, the components are provided in form of powders and/or granules. These may, for example, be chosen with respect to their commercial availability.

The particulate constituents (A) and (B) (or (B-1) and (B-2)), and—where present—(B3), (C) and/or (D) are provided to a mixing device in the required amounts and ratios as previously indicated and optionally mixed prior to the blending step b) in order to obtain a homogenous particulate material mixture. This may require 1 to 60, preferably 1 to 20, in particular 2 to 10 minutes, depending to the amount of particulate material to be mixed.

The thus obtained homogenous particulate material mixture is then transferred to an optionally heatable mixing apparatus and blended therein, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing material such as glass fibers, metal flakes, or else unmelted pigments, colorants, etc. "Liquid-melt" means that the polymer mixture is at least of low fluidity, therefore having softened at least to an extent that it has plastic properties.

Mixing apparatuses used are those known to the skilled person. Components (A) and (B) (or (B-1) and (B-2)), and—where present—(B-3), (C) and/or (D) may be mixed, for example, by joint extrusion, kneading, or rolling, the aforementioned components necessarily having been isolated from the aqueous dispersion or from the aqueous solution obtained in the polymerization.

Examples of mixing apparatus for implementing the method includes discontinuously operating, heated internal kneading devices with or without RAM, continuously operating kneaders, such as continuous internal kneaders, screw kneaders with axially oscillating screws, Banbury kneaders, furthermore extruders, and also roll mills, mixing roll mills with heated rollers, and calenders.

A preferred mixing apparatus used is an extruder or a kneader. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated.

The temperature is guided by the chemical and physical properties of the styrene-based copolymer (A) and the copolymer component (B) (or the constituents (B-1) and (B-2)) and—when present—the polyolefin wax (B-3), the colorant, dye and/or pigment (C) and/or the further additives (D), and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. Mixing apparatus is operated customarily at 150° C. to 400° C., preferably 170° C. to 300° C.

In a preferred embodiment a heatable twin-screw extruder and a speed of 50 to 150 rpm, preferably 60 to 100 rpm is employed. Preferably, an extruding temperature of 170° C. to 270° C., preferably 210° C. to 250° C. is employed to obtain the thermoplastic polymer composition (P).

The thermoplastic polymer composition (P) may be directly used, e.g. in molding processes, preferably injection molding processes, or may be processed to form granules which may be subjected to molding processes afterwards. The molding processes are preferably carried out at temperatures of 170° C. to 270° C., in particular 210° C. to 250° C. to result in polymer molded articles.

A further object of the invention is a polymer composition, comprising 50 to 99 wt.-% of the inventive thermoplastic polymer composition (P) and 50 to 1 wt.-% of at least one further thermoplastic polymer. In a preferred embodiment, the at least one further thermoplastic polymer is selected from styrene-based copolymers other than the styrene-based copolymer (A) (e.g. SAN, AMSAN or SMMA), polyolefins (e.g. polymer derived from ethylene and/or propylene having weight average molecular weights Mw as determined by gel permeation chromatography of more than 10 000 g/mol), polycarbonates, polyamides and mixtures thereof.

The invention further relates to a molded article, prepared from a thermoplastic polymer composition (P) or a polymer composition, comprising a thermoplastic polymer composition (P) in combination with a further thermoplastic polymer as described above. The molded article may be prepared by any known processes for thermoplastic processing.

In particular preparation may be effected by thermoforming, extruding, injection molding, calendaring, blow molding, compression molding, press sintering, deep drawing or sintering, preferably by injection molding.

The thermoplastic polymer composition (P) and the molded articles are advantageously used for the manufacture of components or articles for electronic devices, household goods and automotive parts, in particular for the manufacture of visible components or articles. A preferred application is the use in A/B/C pillars of automobiles.

The properties of the thermoplastic polymer composition (P) according to the present invention were determined. It was surprisingly found by the present inventors that the thermoplastic polymer composition (P) comprising 0.1 to 10 wt.-% of at least one copolymer composition (B) exhibits improved residual gloss after abrasion according to PV3975 combined with improved melt flow characteristics compared to polymer compositions comprising only styrene-based copolymers (A). Heat resistance is not affected.

It was surprisingly found by the present inventors that the thermoplastic polymer composition (P) comprising 0.1 to 10 wt.-% of the at least one copolymer composition (B) shows very low gloss reduction after grid cut test according to PV3952. Moreover, the thermoplastic polymer composition combines improved residual gloss properties with an improved melt volume-flow rate (MVR). On the other hand, properties of the thermoplastic polymer composition (P) remain constant with respect to heat resistance. This specific combination of properties is vital in particular for injection molding processes and final applications.

As regards the gloss reduction, the surfaces of samples prepared from the thermoplastic polymer composition (P) according to the invention preferably exhibit a gloss reduction of less than 5%, preferably less than 3% and most preferably less than 1% after grid cut test according to PV3952.

As regards the residual gloss, the surfaces of samples prepared from the thermoplastic polymer composition (P) according to the invention preferably exhibit a residual gloss of ≥20%, preferably ≥25%, most preferably ≥30% after abrasion was effected according to PV3975 compared to the surface of the non-abraded thermoplastic polymer composition (P).

Concerning the melt characteristics of the thermoplastic polymer composition (P) according to the invention, a melt volume-flow rate (MVR, 220 ml/10 min according to ISO 1133), which is increased by a factor of at least 4, preferably by a factor of at least 6, in particular by a factor of 8, compared to the melt volume-flow rate of a thermoplastic polymer composition which does not comprise the at least one copolymer composition (B) is observed.

In a further embodiment, the heat resistance, determined as the Vicat softening temperature (VST B50, according to DIN EN ISO 306), of the thermoplastic polymer composition (P) is reduced by less than 5° C., preferably less than 3° C., most preferably less than 1° C., compared to the Vicat softening temperature of a thermoplastic polymer composition which does not comprise the at least one copolymer composition (B).

The invention is further illustrated by the examples and claims.

EXAMPLES

Materials
Constituent A
A-1 SAN copolymer with an acrylonitrile content of 24 wt.-%, having a viscosity number VN of 80 ml/g.
A-2 AMSAN copolymer-based composition comprising 96.92 wt.-% of an AMSAN copolymer with an acrylonitrile content of 30 wt.-%, having a viscosity number VN of 57 ml/g and a Vicat softening temperature (VST B50) of 120° C. (commercially available as Luran® HH-120 from INEOS Styrolution, Germany).
The constituent (A-2) further comprised colorant constituents (C) in form of 0.27 wt.-% of Pyrazolone Yellow, 0.78 wt. % of Alizarin Blue, 0.10 wt.-% Alizarin Violet and 0.10 wt.-% Carbon Black.
Furthermore, additive constituents (D) were present in constituent (A-2) in form of 1.35 wt.-% UV stabilizers (Tinuvin 770, Cyasorb 3853, and Chimasorb 994) and 0.48 wt.-% stearyl alcohol.
Constituent (A-2) is commercial available from INEOS Styrolution Group GmbH, Germany under the name Luran HH120 (black).
A-3 PMMA having a melt volume-flow rate (MVR 230° C./3.8 kg) of 1.2 ml/10 min, a Vicat softening temperature (VST B50) of 119° C., a refractive index of 1.49, a density of 1.19 g/ml (commercially available as Plexiglas® HW55 from Evonik Industries AG, Germany).

A-4 PMMA having a melt volume-flow rate (MVR 230° C./3.8 kg) of 6 ml/10 min, a Vicat softening temperature (VST B50) of 103° C., a refractive index of 1.49, a density of 1.19 g/ml (commercially available as Plexiglas® 7N from Evonik Industries AG, Germany).

Constituent B:

B: A composition comprising 5 to 6 wt.-% of $Ca_3(PO_4)_2$, 79 to 85 wt.-% of an PE-PS copolymer comprising alkylsilyl groups and 10 to 15 wt.-% of an polyethylene wax (commercially available as NOF®-Alloy KA147 from NOF Corporation, Japan).

Sample Preparation of Polymer Composition

Example 1 was prepared by compounding the constituents A-1 and B in the amounts given in Table 1 using a Coperion® ZSK25 twin-screw extruder (Tm: 188° C.). Sample plaques (size: 200*140*4 mm) have been prepared via injection molding at 240° C. Examples 2 and 3 were prepared by compounding the constituents A-2 and B in the amounts given in Table 1 using a Coperion® ZSK26MC twin-screw extruder (length: 1035 mm, Tm=239° C.). Sample plaques (size: DIN A5) have been prepared via injection molding at 242° C. (injection pressure 580 bar, higher screw rotational speed 600 mm/s).

Comparative Examples 1, 3 and 4 were prepared in form of sample plaques (size: DIN A5) prepared via injection molding (Tm 242° C.). Comparative Example 2 was prepared via injection molding under the following injection molding conditions: pre-drying (2-3 h, max. 93° C.), mass temperature Tm 220 to 260° C., mold temperature 60° C. to 90° C.

TABLE 1

| Ex. No. | Constituent A | Amount Const. A [wt.-%] | Const. B [wt.-%] |
|---|---|---|---|
| Ex. 1 | A-1 | 99 | 1 |
| Comp. Ex. 1 | A-1 | 100 | — |
| Comp. Ex. 2 | A-3 | 100 | — |
| Ex. 2 | A-2 | 98.5 | 1.5 |
| Ex. 3 | A-2 | 97 | 3 |
| Comp. Ex. 3 | A-2 | 100 | — |
| Comp. Ex. 4 | A-4 | 100 | — |

Testing Methods

The properties of the thermoplastic polymer compositions (P) were evaluated by the following testing methods. The same methods were applied to determine the properties of the constituents (A) to (D), where necessary.

Gloss Reduction

A grid cut test was performed according to PV3952. A steel pin with 1 mm diameter is used (load of 10 N, speed of 1000 mm/min) to create a grid of 20×20 lines (two directions) on the sample (space between two lines is 1 mm). The sample is evaluated 3 days after scratching; the reduction of gloss (in %) is used to evaluate the sample.

Residual Gloss

Abrasion was effected according to PV3975. A Martindale abrasion tester was used with 281Q WOD abrasive paper (9mic, 215.9 mm*279 mm, 3M). All samples have been conditioned at 18-28° C./50% relative humidity for 7 days. The number of cycles during testing was 10 with a load of 12 kPa. After abrasion, gloss was measured at 20° using a Multigloss 268 (Konica Minolta). Gloss retention (residual gloss) is calculated according to the following formula:

$$\text{residual gloss} = \frac{\text{gloss after testing}}{\text{initial gloss}}$$

Melt volume-flow rate (MVR 220° C./10 kg) was measured according to ISO 1133.

Viscosity number was measured according to DIN 53727 at 25° C. as 0.5 wt.-% solution in dimethylformamide (DMF).

Vicat softening temperature (VST B50) was measured according to DIN EN ISO 306.

The weight average molecular weight Mw was determined by gel permeation chromatography using UV-detection. Polystyrene was used as standard. Typically, tetrahydrofuran was used as solvent.

The test results are summarized in Tables 2 (gloss reduction) and 3 (residual gloss, melt volume-flow rate and Vicat softening temperature).

TABLE 2

| Ex. No. | Gloss reduction in [%] |
|---|---|
| Ex. 1 | 0 |
| Comp. Ex. 1 | −17 |
| Comp. Ex. 2 | −0.6 |

The examples clearly show that by the addition of the copolymer composition (B) according to the present invention the styrene-based copolymer (A-1) has significant effect on the improvement of gloss reduction in a grid cut test performed according to the norm PV3952. Upon the addition of only 1 wt.-% of the copolymer composition (B) to the styrene-based copolymer (A-1), gloss reduction was reduced to 0% (Ex. 1).

By contrast, the pure styrene-based copolymer (A-1) exhibits a gloss reduction of −17% in the same experiment (Comp. Ex. 1). Even a poly(methyl methacrylate) sample, a compound which is known for its comparatively high scratch resistance, was found to exhibit a higher gloss reduction of −0.6% (Comp. Ex.2).

TABLE 3

| No. | Residual gloss [%] | MVR 220/10 [ml/10 min] | Vicat softening temperature (VST B50) [° C.] |
|---|---|---|---|
| Ex. 2 | 25 | 47.5 | 114.3 |
| Ex. 3 | 30.8 | 95.2 | — |
| Comp. Ex. 3 | 16.5 | 11.5 | 114.3 |
| Comp. Ex. 4 | 35.9 | — | — |

As can be seen from Table 3, it was surprisingly found that the addition of the copolymer composition (B) results in an increased melt volume-flow rate, while Vicat softening temperature remains unaltered.

In particular, the comparison of Ex. 2 and Comp. Ex. 3 shows an increase in melt volume-flow rate (MVR), which is a very important property for the injection molding process, by a factor of more than 4 upon addition of 1.5 wt.-% of the copolymer composition (B) to the styrene-based copolymer (A-2). Surprisingly, the Vicat softening temperature, which is very important for final application, remained unchanged.

Moreover, the addition of 3 wt.-% of the copolymer composition (B) even resulted in an increase in melt volume-flow rate (MVR) by a factor of more than 8 (Ex. 3).

Moreover, it was found that the residual gloss of the surface of the test specimen is considerably higher after abrasion, if the thermoplastic polymer composition (P) according to the invention is used. The residual gloss is increased from 16.5% for the pure base resin (Comp. Ex. 3) to 25% and 30.8%, respectively, for the inventive thermoplastic polymer compositions of Ex. 2 and Ex. 3, respectively. This was only slightly excelled by the respective value of 35.9% for a PMMA sample (Comp. Ex. 4).

The obtained improved characteristics of the thermoplastic polymer composition (P) according to the present invention therefore turn the composition to a convenient and inexpensive alternative to poly(methyl-methacrylate) compositions and/or UV-cured surfaces in applications such as housings of household goods and electronic devices as well as interior parts in the automotive industry.

The invention claimed is:

1. A thermoplastic polymer composition (P) comprising:
   (A) 90 to 99.9 wt.-%, based on the total weight of the thermoplastic polymer composition (P), of at least one styrene-based copolymer;
   (B) 0.1 to 10 wt.-%, based on the total weight of the thermoplastic polymer composition (P), of at least one copolymer composition comprising:
      (B-1) 75 to 98 wt.-%, based on the total weight of the copolymer composition (B), of at least one copolymer at least comprising repeating units derived from at least one α-olefin monomer and at least one vinyl-aromatic monomer;
      (B-2) 1 to 25 wt.-%, based on the total weight of the copolymer composition (B), of at least one inorganic phosphate compound; and
      (B-3) 1 to 22 wt.-%, based on the total weight of the copolymer composition (B), of at least one polyolefin wax;
   (C) 0 to 9.9 wt.-%, based on the total weight of the thermoplastic polymer composition (P), of at least one colorant, dye, or pigment; and
   (D) 0 to 3 wt.-%, based on the total weight of the thermoplastic polymer composition (P), of at least one further additive.

2. The thermoplastic polymer composition (P) according to claim 1 comprising:
   (A) 95 to 99.5 wt.-%, based on the total weight of the thermoplastic polymer composition (P), of at least one styrene-based copolymer;
   (B) 0.5 to 5 wt.-%, based on the total weight of the thermoplastic polymer composition (P), of at least one copolymer composition comprising:
      (B-1) 75 to 96 wt.-%, based on the total weight of the copolymer composition (B), of at least one copolymer at least comprising repeating units derived from at least one α-olefin monomer and at least one vinyl-aromatic monomer;
      (B-2) 3 to 10 wt.-%, based on the total weight of the copolymer composition (B), of at least one inorganic phosphate compound; and
      (B-3) 1 to 22 wt.-%, based on the total weight of the copolymer composition (B), of at least one polyolefin wax;
   (C) 0 to 4.5 wt.-%, based on the total weight of the thermoplastic polymer composition (P), of at least one colorant, dye, or pigment; and
   (D) 0 to 3 wt.-%, based on the total weight of the thermoplastic polymer composition (P), of at least one further additive.

3. The thermoplastic polymer composition (P) according to claim 1, wherein the at least one inorganic phosphate compound (B-2) comprises at least one alkaline phosphate compound, earth alkaline phosphate compound, or mixtures thereof.

4. The thermoplastic polymer composition (P) according to claim 1, wherein the thermoplastic polymer composition (P) has a gloss reduction of less than 5% after grid cut test according to norm PV3952.

5. The thermoplastic polymer composition (P) according to claim 1, wherein the thermoplastic polymer composition (P) has a melt flow rate (MVR, 220/10), which is increased (improved) by a factor of at least 4, whereas VST B50 shows a reduction of less than 5° C.

6. A process for the preparation of the thermoplastic polymer composition (P) according to claim 1, wherein the process comprises at least the following steps:
   a) providing the components (A) and (B), and, when present, (C) and/or (D), in the predetermined amounts to an optionally heatable mixing device; and
   b) blending the components (A) and (B), and, when present, (C) and/or (D), in the optionally heatable mixing device at temperatures above the glass transition temperature of the components (A) and (B), and, when present, (C) and/or (D), to obtain the thermoplastic polymer composition (P);

or wherein the process comprises at least the following steps:
   a) providing the components (A), (B-1), and (B-2), and, when present, (B-3), (C), and/or (D), in the predetermined amounts to an optionally heatable mixing device; and
   b) blending the components (A), (B-1), and (B-2), and, when present, (B-3), (C), and/or (D), in the optionally heatable mixing device at temperatures above the glass transition temperature of the components A), (B-1), and (B-2), and, when present, (B-3), (C), and/or (D), to obtain the thermoplastic polymer composition (P).

7. A molded article, prepared from the thermoplastic polymer composition (P) according to claim 1.

8. A method of making components or articles for electronic devices, household goods, and automotive parts, comprising the thermoplastic polymer composition (P) according to claim 1.

9. The thermoplastic polymer composition (P) according to claim 1, wherein the copolymer composition (B) comprises as constituent (B-1) 77 to 92 wt.-%, based on the total weight of the copolymer composition (B), of at least one copolymer at least comprising repeating units derived from at least one a-olefin monomer and at least one vinyl-aromatic monomer.

10. The thermoplastic polymer composition (P) according to claim 1, wherein copolymer composition (B) comprises as constituent (B-2) 3 to 10 wt.-%, based on the total weight of the copolymer composition (B), of at least one inorganic phosphate compound.

11. The thermoplastic polymer composition (P) according to claim 1, wherein copolymer composition (B) comprises as constituent (B-3) 5 to 20 wt.-%, based on the total weight of the copolymer composition (B), of at least one polyolefin wax.

12. The thermoplastic polymer composition (P) according to claim 1 wherein the thermoplastic polymer composition (P) has a residual gloss of ≥25% after abrasion was effected according to norm PV3975 compared to the surface of the non-abraded thermoplastic polymer composition (P).

13. The thermoplastic polymer composition (P) according to claim 1, wherein the thermoplastic polymer composition (P) has a residual gloss of ≥30% after abrasion was effected according to norm PV3975 compared to the surface of the non-abraded thermoplastic polymer composition (P).

14. The thermoplastic polymer composition (P) according to claim 4, wherein the thermoplastic polymer composition (P) has a gloss reduction of less than 3% after grid cut test according to norm PV3952.

15. The thermoplastic polymer composition (P) according to claim 4, wherein the thermoplastic polymer composition (P) has a gloss reduction of less than 1% after grid cut test according to norm PV3952.

16. The thermoplastic polymer composition (P) according to claim 5, wherein the thermoplastic polymer composition (P) has a melt flow rate (MVR, 220/10), which is increased (improved) by a factor of at least 6.

17. The thermoplastic polymer composition (P) according to claim 5, wherein VST B50 shows a reduction of less 3° C.

18. The thermoplastic polymer composition (P) according to claim 5, wherein VST B50 shows a reduction of less 1° C.

19. A method of making components or articles for electronic devices, household goods, and automotive parts, comprising the molded article according to claim 7.

20. The molded article according to claim 7, wherein the molded article is a component or article for electronic devices, household goods, and automotive parts.

\* \* \* \* \*